United States Patent
Serrat et al.

(10) Patent No.: US 12,262,708 B2
(45) Date of Patent: Apr. 1, 2025

(54) PLANT TREATMENT SYSTEM

(71) Applicant: BILBERRY SAS, Gentilly (FR)

(72) Inventors: Hugo Serrat, Gentilly (FR); Simao Soares, Wijhe (NL)

(73) Assignee: BILBERRY SAS, Gentilly (FR)

( * ) Notice: Subject to any disclaimer, the term of this patent is extended or adjusted under 35 U.S.C. 154(b) by 46 days.

(21) Appl. No.: 17/775,134

(22) PCT Filed: Nov. 9, 2020

(86) PCT No.: PCT/IB2020/060534
§ 371 (c)(1),
(2) Date: May 6, 2022

(87) PCT Pub. No.: WO2021/090294
PCT Pub. Date: May 14, 2021

(65) Prior Publication Data
US 2022/0408715 A1    Dec. 29, 2022

Related U.S. Application Data

(60) Provisional application No. 62/933,388, filed on Nov. 9, 2019.

(51) Int. Cl.
*A01M 7/00*    (2006.01)
*G05B 19/4155*    (2006.01)

(52) U.S. Cl.
CPC ....... *A01M 7/0089* (2013.01); *G05B 19/4155* (2013.01); *G05B 2219/45013* (2013.01)

(58) Field of Classification Search
CPC .............. A01M 7/0089; A01M 7/0042; A01M 7/0035; A01M 7/0025; A01M 7/0057;
(Continued)

(56) References Cited

U.S. PATENT DOCUMENTS 10,255,670 B1 *    4/2019    Wu ........................ H04N 7/183
10,803,311 B2 *    10/2020    Halligan ................ G06V 10/25
(Continued)

FOREIGN PATENT DOCUMENTS

CA    3133882 A1 *    10/2020    .......... A01M 7/0089
DE    102014226189 A1    6/2016
(Continued)

OTHER PUBLICATIONS

International Search Report and Written Opinion and English translation for corresponding International Application No. PCT/IB2020/060534, dated Feb. 17, 2021.

*Primary Examiner* — Ebony E Evans (57) ABSTRACT

A system for treating plants, in particular in agriculture, comprising a spray boom (RP) provided with a plurality of spray nozzles (BPi) supplied by a spray control device, and comprising a set of cameras (CAk) capable of capturing images of an area to be treated, a digital processing device capable of analyzing the images captured by the camera, identifying plants to be treated and applying commands to the spray control device with a view to selectively spraying a product on plants to be treated, each camera (CAk) being capable of capturing images of the crop area.

According to the invention, the system comprises a memory in which mapping data relating to mapping between a camera reference system and a spraying reference system are stored, and the digital processing circuit is capable, on the basis of said mapping data, of applying, to the images captured by each camera (CAk), subdivision data (Gk) for subdividing the image into cells corresponding to spray areas on the ground that are to be sprayed by respective spray nozzles, in order to thereby directly determine, from
(Continued)

said subdivision data, at least one nozzle to be activated and its activation time when a plant to be treated is identified in a given cell of the image.

11 Claims, 7 Drawing Sheets

(58) Field of Classification Search
CPC ............ A01M 7/0092; G05B 19/4155; G05B 2219/45013; G05B 2219/45017
See application file for complete search history.

(56) References Cited

U.S. PATENT DOCUMENTS

| | | | |
|---|---|---|---|
| 2017/0223947 A1* | 8/2017 | Gall | ...................... A01B 79/005 |
| 2019/0150357 A1* | 5/2019 | Wu | ........................ H04N 7/188 |
| 2019/0362146 A1* | 11/2019 | Polzounov | ............. G06N 3/045 |
| 2020/0045953 A1* | 2/2020 | Serrat | .................. A01M 7/0042 |
| 2021/0185942 A1* | 6/2021 | Sibley | .................. A01M 7/0089 |
| 2021/0368686 A1* | 12/2021 | Wisdom | ................. B25J 9/1697 |

FOREIGN PATENT DOCUMENTS

| | | | | |
|---|---|---|---|---|
| DE | 102020126960 A1 * | 4/2022 | ........... A01B 69/001 |
| EP | 3165073 A1 * | 5/2017 | ............. A01C 23/00 |
| EP | 3357332 A1 | 8/2018 | |
| EP | 3446564 A1 | 2/2019 | |
| EP | 3932162 A1 * | 1/2022 | ........... A01B 69/001 |
| WO | 2018142371 A1 | 8/2018 | |
| WO | 2018154490 A1 | 8/2018 | |
| WO | 2019094266 A1 | 5/2019 | |

\* cited by examiner

PLANT TREATMENT SYSTEM

CROSS-REFERENCE TO RELATED PATENT APPLICATIONS

This application is a U.S. National Stage Application under 35 U.S.C. § 371 of International Patent Application No. PCT/IB2020/060534, filed Nov. 9, 2020, which claims the benefit of priority of U.S. Provisional Application No. 62/933,388 filed Nov. 9, 2019, both of which are incorporated by reference in their entireties. The International Application was published on May 14, 2021, as International Publication No. WO/2021/090294 A1.

FIELD OF THE INVENTION

The present invention generally relates to systems for the smart spraying of plants in agriculture.

PRIOR ART

Document WO2018154490A1 in the name of the Applicant already discloses a spraying system for the treatment of plants in agriculture, comprising a spray boom provided with a plurality of spray nozzles supplied by a spray control device, and comprising a set of cameras capable of capturing images of a crop area, a digital processing device capable of analyzing the images captured by the camera, identifying plants to be treated and applying commands to the spray control device with a view to selectively spraying a product on plants to be treated.

In this known system, a spray nozzle to be activated and a spray start time are determined depending on a certain number of parameters, including the position of a plant to be treated in an image, the height of the camera relative to the ground, the orientation of the main axis of the camera and the speed of advancement of the system.

SUMMARY OF THE INVENTION

The present invention aims to achieve at least one of the following three objectives:
  simplify the calculations related to these operations, in particular to reduce the consumption of on-board calculation resources,
  make the association between the location of a plant to be treated and a nozzle to be activated as well as the spray start time more reliable, and
  make the implementation of a plant recognition system by image analysis more adaptable to different spraying systems on the market.

To this end, a system is proposed for treating plants, in particular in agriculture, comprising a spray boom provided with a plurality of spray nozzles supplied by a spray control device, and comprising a set of cameras capable of capturing images of an area to be treated, a digital processing device capable of analyzing the images captured by the camera, identifying plants to be treated and applying commands to the spray control device with a view to selectively spraying a product on plants to be treated, each camera being capable of capturing images of the crop area, characterized in that the system comprises a memory in which mapping data relating to mapping between a camera reference system and a spraying reference system are stored, and in that the digital processing circuit is capable, on the basis of said mapping data, of applying, to the images captured by each camera, subdivision data for subdividing the image into cells corresponding to spray areas on the ground that are to be sprayed by respective spray nozzles, in order to thereby directly determine, from said subdivision data, at least one nozzle to be activated and its activation time when a plant to be treated is identified in a given cell of the image.

This system comprises, advantageously but optionally, the following additional features, taken individually or in any combination that a person skilled in the art would deem as being technically compatible:
  The subdivision data comprise a grid having columns of cells corresponding to the trajectory of respective spray nozzles as the system advances, and rows of cells corresponding to spray times.
  The nozzles are oriented so as to spray a treatment product in a generally vertical direction, and the axes of the cameras are inclined obliquely forwards and downwards with respect to the advancement of the boom.
  The system comprises a device for dynamically determining at least one geometric parameter of each camera relative to the ground and for dynamically adjusting the subdivision data according to variations in the geometric parameter or parameters.
  The geometric parameter includes a height of each camera measured from the ground.
  The geometric parameter includes a signal for controlling the height of each camera relative to the ground.
  The processing circuit is capable of determining a prevalence of a plant to be treated in each cell where the presence of the plant is determined.
  The system is capable of activating a spray nozzle corresponding to a given cell only if said prevalence is greater than a threshold.
  The system is capable of activating a spray nozzle corresponding to a given cell depending on the type of plant identified by the digital processing circuit.
  The system is capable of activating a spray nozzle corresponding to at least one cell neighboring a cell in which the presence of a plant to be treated is detected.

According to a second aspect, a method for calibrating a system as defined above is proposed, characterized in that it comprises the following steps:
  applying, on generally flat ground in front of the boom (RP), itself positioned at a predetermined height relative to the ground, a reference pattern comprising a marking that is representative of the anticipated movement of one or more spray nozzles over the ground during advancement of the system,
  capturing at least one image with a camera corresponding to the relevant nozzle or nozzles, and
  determining, on the basis of the position of the marking in the or each image, some or all of the subdivision data for the relevant camera, for said predetermined height.

A method is also proposed for selectively spraying an area of a field on which a system as defined above is moving, characterized in that it comprises the following steps:
  determining, in an image captured by a camera, the location of a plant to be sprayed,
  determining, directly by means of the processing circuit and using the subdivision data, at least one nozzle to be activated and a spray start time for or each nozzle to be activated.

BRIEF DESCRIPTION OF THE DRAWINGS

Other aspects, aims and advantages of the present invention will become more apparent upon reading the following detailed description of preferred embodiments thereof, given by way of non-limiting example and with reference to the appended drawings, in which.

DETAILED DESCRIPTION OF EMBODIMENTS

A treatment system to which the present invention applies is, by way of example, that described in document WO2018142371A1 or WO2018154490A1 in the name of the Applicant, to which a person skilled in the art would refer for more information.

As shown schematically in FIGS. 1 and 3A to 3E, such a system here comprises a tractor T from which extends a spray boom RP to the left and right, only the left half of said system being illustrated in FIG. 3A to 3E. It could also be any mobile robotic treatment system. The boom is provided with a set of spray nozzles BPi that are or are not regularly spaced and that are connected by respective control valves to a source of a product to be sprayed under pressure, and a set of cameras CAk of which the lines of sight plunge forwards and that extend, preferably but not necessarily, in vertical planes that are parallel to a longitudinal axis AL of the system. The system moves over an agricultural area to be treated at a speed V. It may more generally be a system moving over any type of terrain to be treated.

The lateral spacing of the cameras CAk can be independent of the spacing of the nozzles. Its order of magnitude is typically a multiple of the lateral spacing of the nozzles.

The system also comprises communication and digital processing circuits CT for receiving the images captured by the cameras CAk, for determining, typically by learning processes, the presence of weeds in the images captured (distinguishing them from cultivated species, or on bare ground), and for outputting individual spray control signals to the valves so as to essentially limit the spraying of the product to regions occupied by weeds.

Document WO2018154490A1 describes the determination of the time at which a valve is controlled depending on the position of a weed in a captured image and a certain number of parameters of the system.

The invention will now be described in detail.

Figure 1:
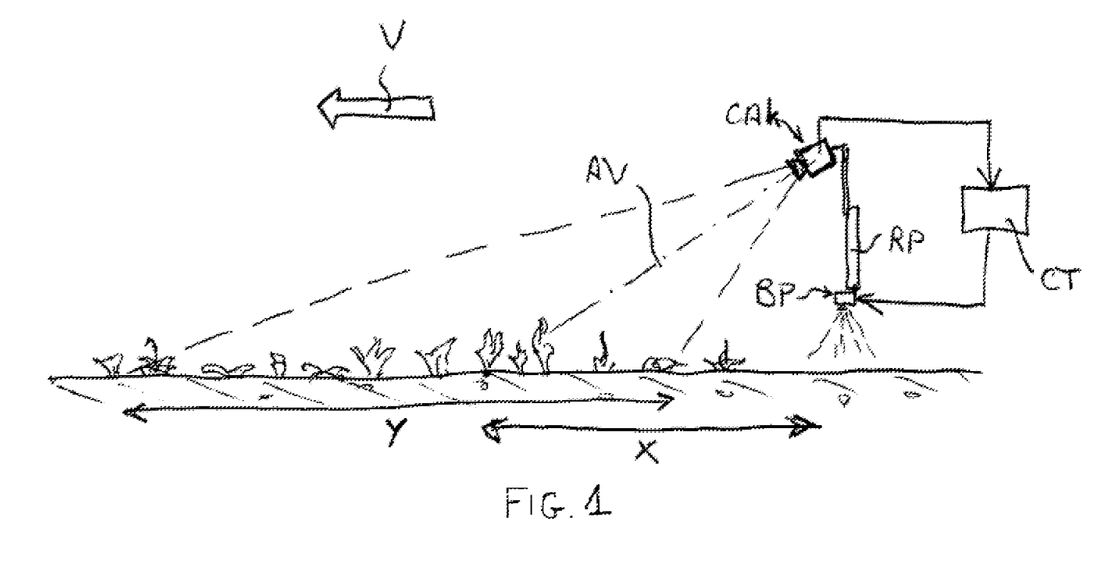
FIG. 1 is a schematic side view of part of a system according to the invention moving over an agricultural area to be treated.
Figure 2A:
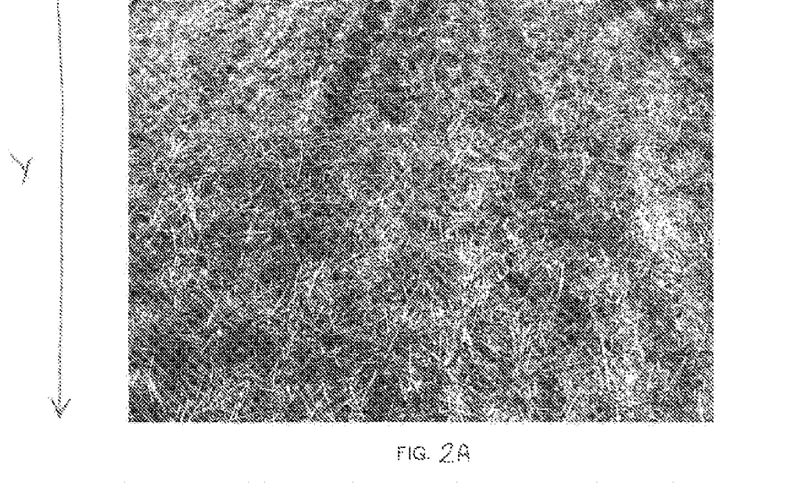
FIG. 2A is a view of an area to be treated captured by a camera of the system from FIG. 1.
Figure 2B:
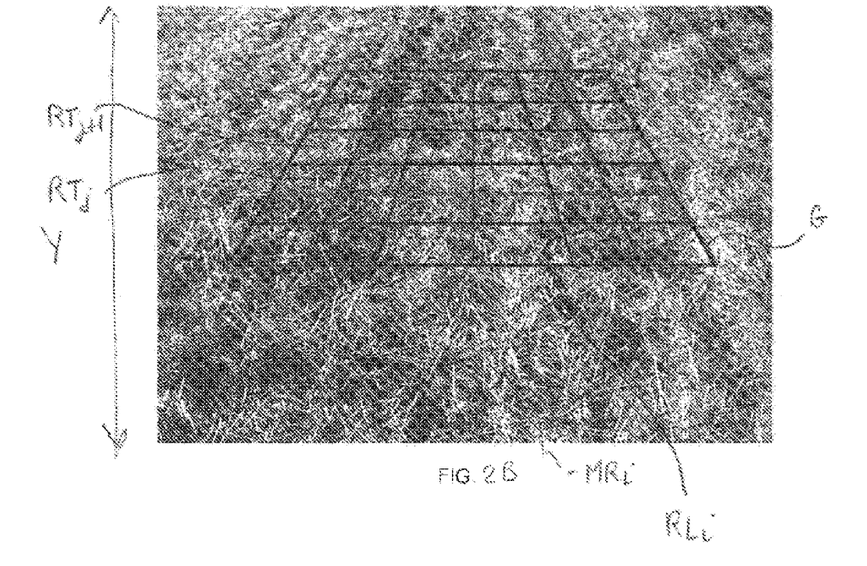
FIG. 2B is a view of the same area with a virtual subdivision grid projected onto said area.

Each camera of such a system as described above captures images of the agricultural area to be treated with a plunging line of sight AV that strikes the ground at a distance of X meters in front of the camera, and the aperture of the camera is such that the dimension of the part of the area to be treated that is captured by the image is Y meters in the direction of advancement of the system, as illustrated in FIGS. 1, 2A and 2B.

The digital processing circuits CT of the system are capable of subdividing each image captured into a plurality of sub-images or cells according to a subdivision grid G as illustrated in FIG. 2B and FIG. 3A-3E, the shape of which is such that each cell in the image corresponds to a rectangular or square sub-area of the agricultural area to be treated. To this end, the grid G here has a trapezoidal contour, the horizontal lines being transverse to the advancement of the system and the other lines corresponding to vanishing lines in the perspective view from above generated by the camera. It should be noted that, in the case of a camera of which the line of sight is oriented vertically, the contour of the grid G is rectangular. In order to achieve this subdivision into cells as precisely as possible, the digital processing device takes account, in particular, of the geometric values defining the position of the camera (orientation of the line of sight along the 3 axes, height of the camera relative to the ground, distance between the camera and the spray nozzles. Preferably, the digital processing device can also take into account any distortion of the image (vignetting, etc.) associated with its optics.

In a first embodiment, this subdivision is based, firstly, on the spacing between the nozzles, such that the center line MRi of a longitudinal row RLi of the grid G is located vertically in line with a given nozzle BPi. In a specific case, there may be only one longitudinal row. The grid is also based on a temporal subdivision, a delay or spraying period $\Delta Tj$ corresponding to a transverse row RTj of the grid G. To this end, the system is initialized on the basis of stored digital information typically comprising the position of each nozzle and each camera in a common three-dimensional reference system, the viewing angle of each camera (if necessary in the three planes of the reference system), a direction (most often vertical) and a spraying pattern (shape of the cone) of the nozzles, the advancement speed V of the system (which can typically be determined in real time and supplied to the system). This information makes it possible, in particular, to deduce essential information such as the spacing of the nozzles and their relationship with the position of the cameras in the vertical direction, in the lateral direction and in the advancement direction of the system, and the grid is constructed in combination with the information relating to the speed V or position of the system. The speed or position can be determined by different types of sensors, in particular an inertial measurement unit, precision GPS unit, LIDAR, SLAM-type simultaneous localization and cartographic system, etc. In certain applications, in particular for the treatment of plants on railway tracks, the viewing direction of the camera or cameras may be transverse to the advancement direction of the system, or even oblique.

If necessary, an initial calibration of the system can be carried out by placing the spraying system on a flat surface and by affixing to this surface a tarpaulin or flexible sheet having a marking comprising a set of lines representing the trajectories of the nozzles on the ground when the system moves along its trajectory—therefore said lines are spaced laterally by a distance that is equal to the spacing between the nozzles. The system is then moved along this trajectory and the calibration images captured by each of the cameras comprise, on a plain background, a set of lines of which the positions in the images correspond to the center lines of the subdivisions of the grid, it being possible to determine and store the longitudinal lines of said grid by simple extrapolation from the center lines captured.

The transverse lines of the grid are in turn determined from the orientation data of the cameras, and will most often be horizontal lines in the pixel matrix of the captured images, the positions of which in the image are calculated so as to correspond to constant ground intervals, and therefore at constant travel times when the system is moving at its set speed.

As an alternative to calibration using a physical tarpaulin on the ground, the system may incorporate any other type of initialization or calibration.

This subdivision thus produces a mapping between each sub-area of the agricultural area to be treated, resulting from the subdivision by the grid G, and a pair (nozzle number, spray time).

In this way, during operation, when a plant to be sprayed is located at a time t in a given cell of a captured image, the system then determines in real time, by means of the above-mentioned mapping, which spray nozzle should be activated, and when it should be activated.

The duration of spraying essentially depends on the dimension of the spray pattern on the ground with respect to the dimension of a cell of the grid between two successive transverse separation lines, as will be detailed below. In particular, the shorter the dimension of the spray pattern in the direction of movement of the system, the longer the duration of spraying will have to be in order to cover the entire subdivision on the ground by applying the sufficient quantity of product.

Furthermore, the spray start time is determined, firstly, from the position of the relevant subdivision in the grid and, secondly, from the overall amount of time required between the moment when an image is captured and when the valve associated with the nozzle to be activated actually opens, said amount of time generally being a controlled delay constituting an intrinsic parameter of the system, which possibly depends on the position of the nozzle BPi on the boom RP.

According to an alternative embodiment, instead of a speed of movement of the system, a current position of the system, as determined on a continuous basis by a precision GPS unit, in particular centimetric GPS or the like, is input to the system. In this case, the transverse subdivision lines of the grid G are no longer determined using the measured speed of the system, but from the current position of the system as a function of time, given by the GPS unit.

Re-Adjustment of Image/Spray Pattern Mapping

During operation, the mapping between the subdivision of the agricultural area to be treated and the nozzle spray map may become incorrect.

This can occur, in particular, with variations in the geometry of the ground and the movements of the boom when the tractor is moving over uneven ground, or even with a variation in the speed of advancement of the system.

In this case, a new, dynamic mapping is required. This can be done by causing the digital processing device to recalculate in real time the parameters of the grid G by taking into account correction factors. These factors include, but are not limited to, the following:
- variations in absolute orientation of the cameras, determined for example using an inertial measurement unit provided on the boom,
- variations in the camera-ground distance, measured dynamically using any appropriate device or even from camera height control data if the boom is provided with height adjustment means,
- variations in the profile of the ground ahead of the system (for example in connection with the presence of slopes on uneven ground), measured dynamically, for example by measuring the boom-ground distance directly above the camera and also at a certain distance in front of the system,
- variations in the speed of advancement of the system, measured by a tachometer, a GPS unit, etc.

According to one aspect of the invention, in order to decide whether or not to trigger spraying on a sub-area of the ground that corresponds to a cell of the image in which the presence of weeds has been determined from the image analysis, the system calculates a weed development coefficient or weed prevalence in this cell. In an exemplary embodiment, this coefficient is the percentage of the area of the subdivision occupied by weeds relative to the total area of the cell.

An example implementation of this functionality will now be illustrated with reference to FIG. 3A to 3E, in which, firstly, the main equipment of the system as described above, secondly, the projection onto the ground Gk' of the grid Gk used to subdivide the images captured by the camera CAk and, thirdly, hatched areas representing the presence of plants to be sprayed, typically weed plants identified by the processing circuit in the images captured by said camera CAk, are illustrated.

Figure 3A:
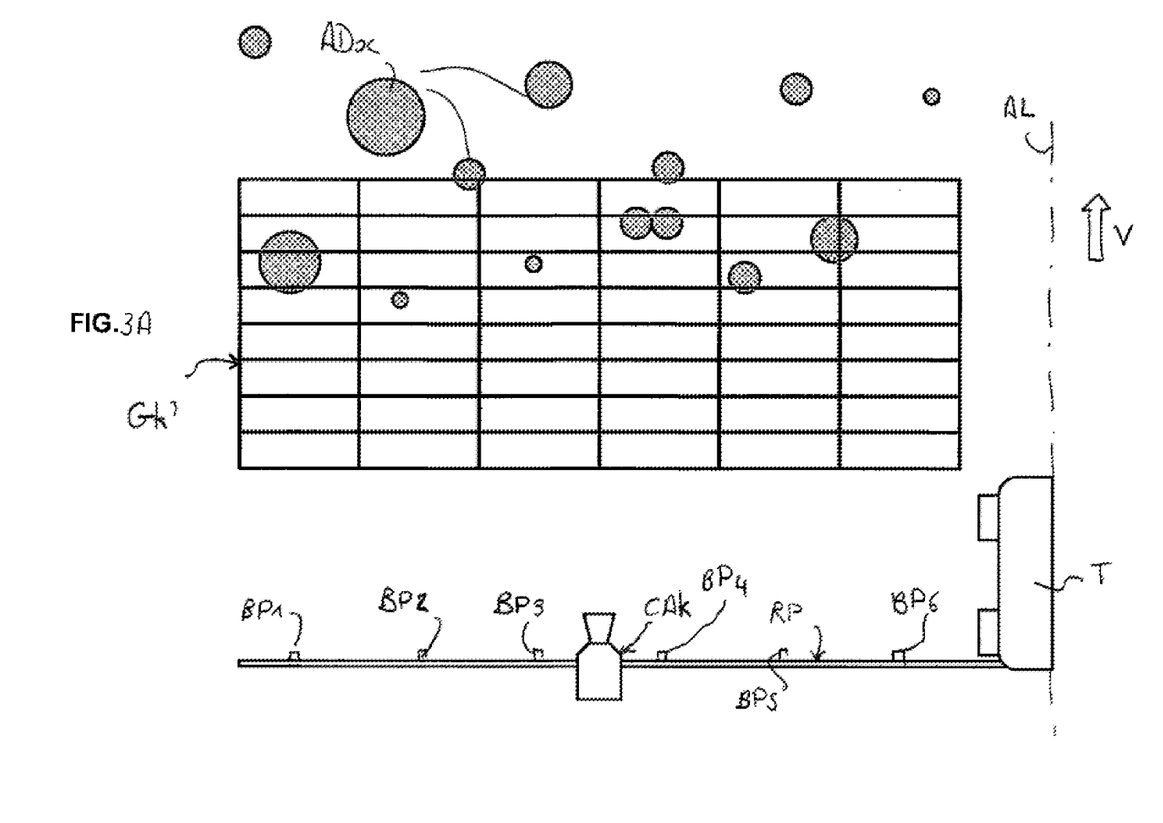
FIG. 3A to 3E are schematic views, from above, of the left half of the spray system of the invention in different positions and in different states.

FIG. 3A illustrates a first phase of the movement of the system, arriving on a region of the area to be treated where such weeds are present and illustrated by dotted circles ADx of which the size is related to the size or the density of the weeds.

Figure 3B:
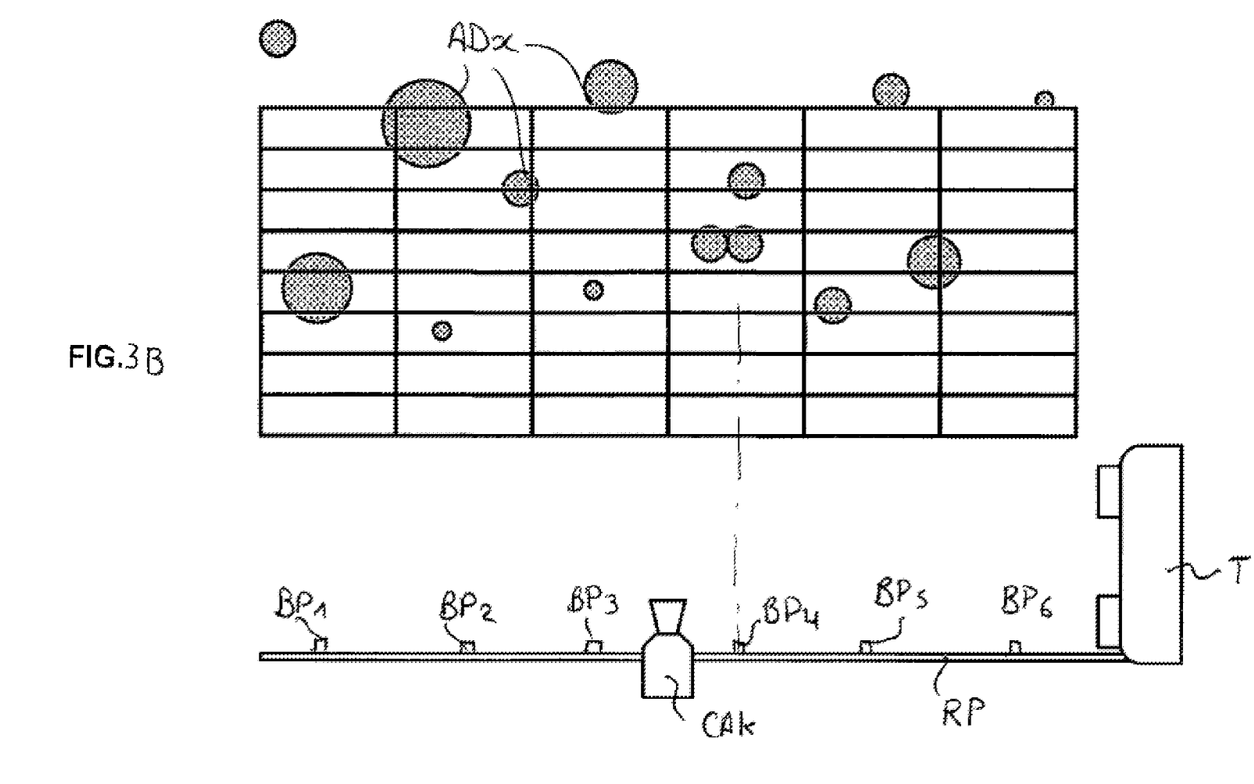
Figure 3C:
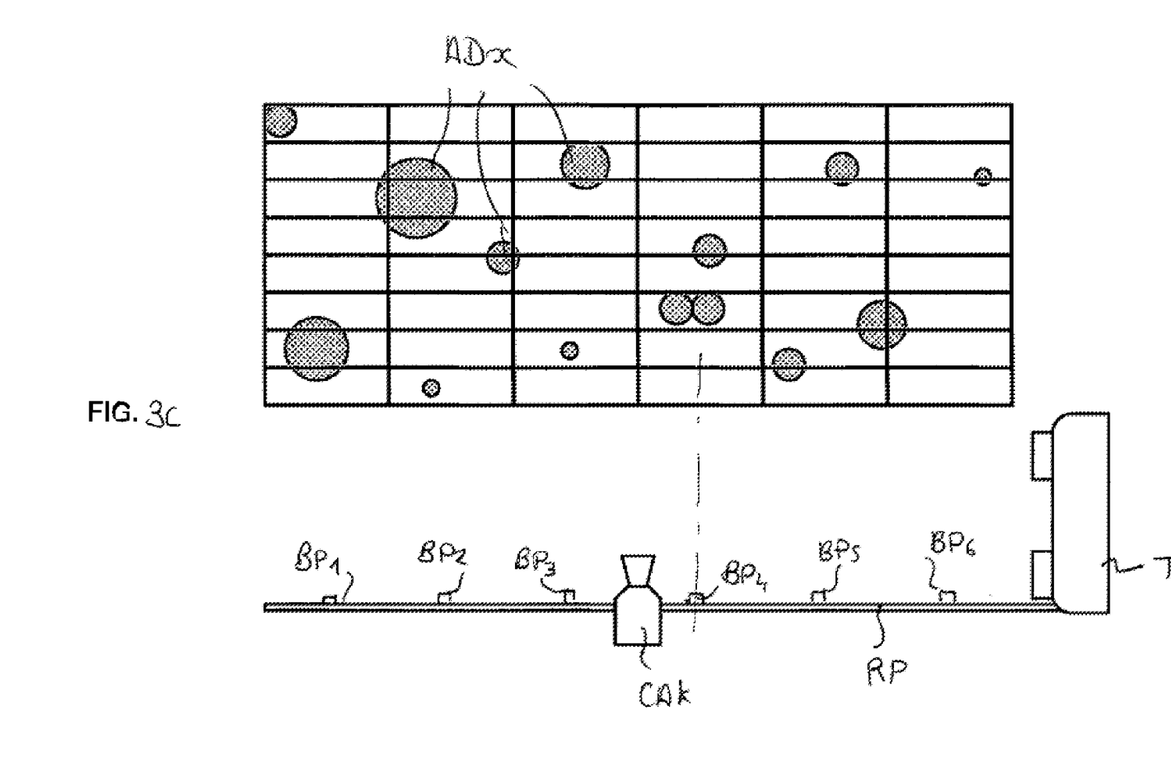

FIGS. 3B and 3C illustrate the position of the system after a period of time equal to approximately $2 \times \Delta t$ and $4 \times \Delta t$, respectively, has elapsed, where $\Delta t$ is the spacing between two transverse subdivision lines, with a factor equal to the speed of advancement of the system as explained above.

Figure 3D:
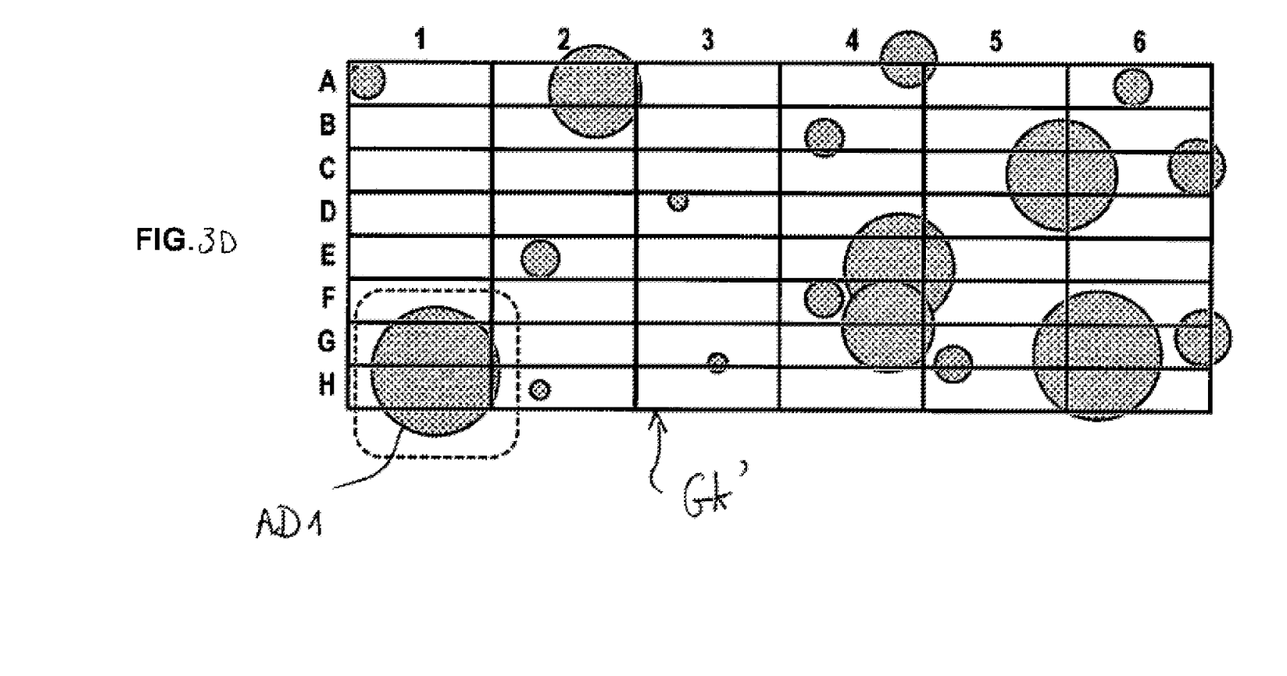

FIG. 3D the grid Gk' in relation to the weeds at a given time in a new situation for the presence of weeds. In this figure, the different sub-areas of the ground corresponding to the respective cells of the grid are designated by a combination of a letter and a number as illustrated. The subdivisions X-1 to X-6 (X designating any letter) correspond to the trajectories of six respective spray nozzles BP1 to BP6 aligned substantially with the center of said subdivisions.

The area of weeds AD1 located in the bottom left corner of the figure straddles multiple subdivisions.

As can be seen here, the prevalence of weeds in the subdivisions G1 and H1 is above the threshold of 50%, and the prevalence is below said threshold in the cells F1, G2 and D2. Consequently, only nozzle no. 1 will be activated, over a time interval corresponding to travel through the cells H1 and G1 (in the order given by advancement of the system).

In order to decide whether or not a spray nozzle should be actuated, the system can also take into account the type of plant to be treated, in particular the type of weed, as detected in a captured image, in particular by modifying the prevalence threshold.

Furthermore, the shape of the spray pattern is generally circular, whereas each cell is rectangular. Consequently, the area actually sprayed never corresponds exactly to the relevant cell. Advantageously, a spray pattern of which the area on the ground is at least equal to the air of the corresponding cell located vertically in line with the nozzle is chosen. In this way, in the present case, nozzle no. 1 will continue to spray the weed or the set of weeds, even in the part thereof located in the cell F1 at the time of FIG. 3D.

According to another aspect, it is possible to adjust the spray start and end times for a given nozzle such that the area actually sprayed covers, in the advancement direction, more than the cells where the weed coverage rate is above the threshold.

Figure 3E:
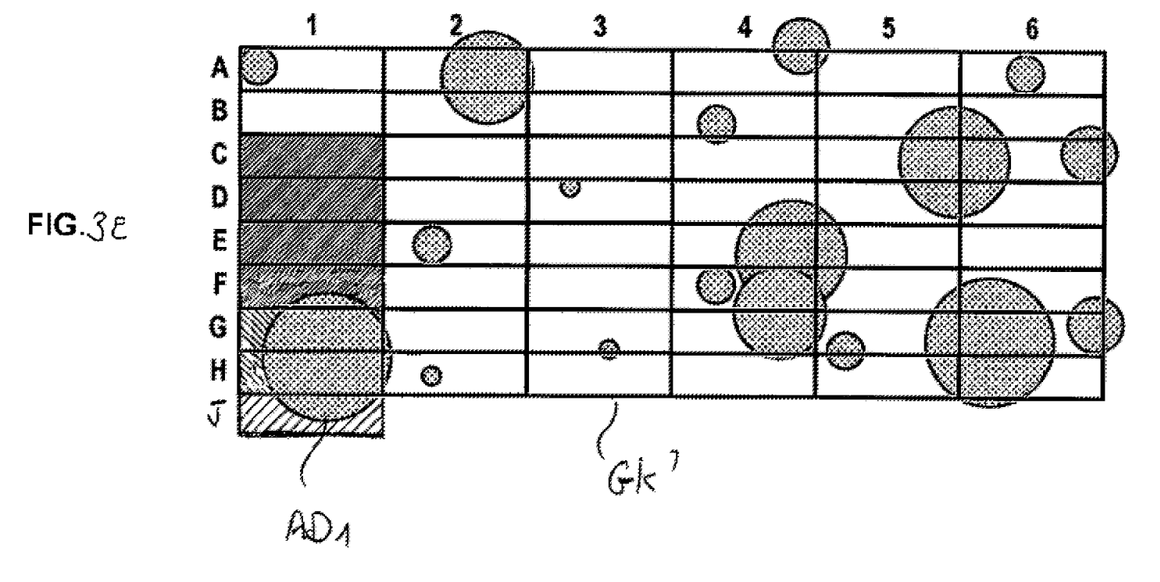

Therefore, in the example illustrated in FIG. 3E, actual spraying begins one cell earlier (on J1) and ends four cells later (on C1, inclusive), so as to ensure more extensive spraying than the plant itself to be treated. This makes it possible, for example, to guarantee, in particular in the event of system drift, of wind liable to deflect the cone of sprayed liquid, etc., that the area of weeds to be treated is actually and sufficiently covered.

According to yet another aspect, when a weed is detected in a given cell, it is possible to activate the spray nozzles adjacent to the nozzle associated with this cell. In the example of FIG. 3E, the system will then activate nozzle no. 2 (here no nozzle no. 0 due to being at the end of the boom) at the same time as nozzle no. 1 in order to cover the cells H2 and G2 (it is also conceivable to cover the cells J2 and F2, etc.). This choice to activate the spraying in the neighboring cells can also be determined according to the type of weed identified in the image captured by the processing circuits.

In this way, the herbicide treatment is improved by at least one of the following aspects:
- taking into account the deflection of spray patterns by the wind;
- taking into account areas sheltered from the spraying due to stubble or other obstacles,
- spraying from different angles of attack in order to more effectively target a weed, in particular of the bushy type, etc.

Of course, the present invention is in no way limited to the embodiments described and represented, but rather a person skilled in the art will know how to make numerous variations and modifications thereto.

The present invention can be used, in particular, for localized weed control on different types of land: agricultural land, thoroughfares, in particular railway tracks, etc.

The invention claimed is:

1. A system comprising:
a spray boom provided with a plurality of spray nozzles supplied by a spray control device;
a set of cameras capable of capturing images of an area to be treated;
a memory in which mapping data relating to mapping between a camera reference system and a spraying reference system is stored;
a digital processing device capable of analyzing the images captured by the camera, identifying plants to be treated and applying commands to the spray control device to selectively spray a product on plants to be treated; the digital processing device being capable, on the basis of said mapping data, of applying, to the images captured by each camera, subdivision data for subdividing the image into cells corresponding to spray areas on the ground that are to be sprayed by respective spray nozzles, in order to thereby directly determine, from said subdivision data, at least one nozzle to be activated and its activation time when a plant to be treated is identified in a given cell of the image; and
a device for dynamically determining at least one geometric parameter of each camera relative to the ground and for dynamically adjusting the subdivision data according to variations in the geometric parameter or parameters.

2. The system according to claim 1, wherein the subdivision data comprise a grid having columns of cells corresponding to a trajectory of respective spray nozzles as the system advances, and rows of cells corresponding to spray times.

3. The system according to claim 1, wherein the nozzles are oriented so as to spray a treatment product in a generally vertical direction, and in that a line of sight of each of the cameras are inclined obliquely forwards and downwards with respect to the advancement of the boom.

4. The system according to claim 1, wherein the geometric parameter includes a height of each camera measured from the ground.

5. The system according to claim 1, wherein the geometric parameter includes a signal for controlling the height of each camera relative to the ground.

6. The system according to claim 1, wherein the digital processing device is configured to determine a prevalence of a plant to be treated in each cell where the presence of the plant is determined.

7. The system according to claim 6, further configured to activate a spray nozzle corresponding to a given cell only if said prevalence is greater than a threshold.

8. The system according to claim 6, further configured to activate a spray nozzle corresponding to a given cell depending on the type of plant identified by the digital processing circuit.

9. The system according to claim 1, further configured to activate a spray nozzle corresponding to at least one cell neighboring a cell in which the presence of a plant to be treated is detected.

10. A method for calibrating a system according to claim 1, comprising the following steps:
applying, on generally flat ground in front of the boom, itself positioned at a predetermined height relative to the ground, a reference pattern comprising a marking that is representative of the anticipated movement of one or more of the spray nozzles over the ground during advancement of the system,
capturing at least one image with one of the cameras corresponding to the relevant nozzle or nozzles, and
determining, on the basis of the position of the marking in the or each image, some or all of the subdivision data for the relevant camera, for said predetermined height.

11. A method for selectively spraying land on which a system according to claim 1 is moving, comprising the following steps:
determining, in an image captured by a camera, the location of a plant to be sprayed,
determining, directly by means of the processing circuit and using the subdivision data, at least one nozzle to be activated and a spray start time for each nozzle to be activated.

* * * * *